United States Patent
Chen

(10) Patent No.: US 10,416,305 B2
(45) Date of Patent: Sep. 17, 2019

(54) POSITIONING DEVICE AND POSITIONING METHOD

(71) Applicant: HTC Corporation, Taoyuan (TW)

(72) Inventor: Yuan-Tung Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 4 days.

(21) Appl. No.: 15/818,772

(22) Filed: Nov. 21, 2017

(65) Prior Publication Data

US 2018/0143317 A1  May 24, 2018

Related U.S. Application Data

(60) Provisional application No. 62/424,556, filed on Nov. 21, 2016.

(51) Int. Cl.

| | | |
|---|---|---|
| *G01S 15/02* | (2006.01) | |
| *G01S 15/08* | (2006.01) | |
| *G06T 7/73* | (2017.01) | |
| *G06T 7/60* | (2017.01) | |
| *G01S 15/93* | (2006.01) | |
| *G01S 17/89* | (2006.01) | |
| *G01S 15/10* | (2006.01) | |
| *G01S 15/42* | (2006.01) | |

(52) U.S. Cl.
CPC ............ *G01S 15/025* (2013.01); *G01S 15/08* (2013.01); *G01S 15/10* (2013.01); *G01S 15/42* (2013.01); *G01S 15/93* (2013.01); *G01S 17/89* (2013.01); *G06T 7/60* (2013.01); *G06T 7/74* (2017.01); *G06T 2207/10028* (2013.01); *G06T 2207/30244* (2013.01)

(58) Field of Classification Search
CPC ........ G01S 15/025; G01S 15/93; G01S 15/42; G01S 15/10; G01S 17/89; G01S 15/08; G06T 7/60; G06T 7/74; G06T 2207/10028; G06T 2207/30244
USPC ........................................................ 382/106
See application file for complete search history.

(56) References Cited

U.S. PATENT DOCUMENTS

| | | | |
|---|---|---|---|
| 9,281,727 B1 | 3/2016 | Coley et al. | |
| 2013/0237811 A1* | 9/2013 | Mihailescu | ............ A61B 5/064 600/424 |
| 2015/0106053 A1* | 4/2015 | Ocal | ........................ G01S 15/46 702/150 |

FOREIGN PATENT DOCUMENTS

| | | |
|---|---|---|
| TW | 201022700 A | 6/2010 |
| TW | 201508303 A | 3/2015 |

(Continued)

OTHER PUBLICATIONS

Corresponding extended European search report dated Apr. 10, 2018.
Corresponding Taiwan office action dated Mar. 6, 2018.

*Primary Examiner* — Amandeep Saini
(74) *Attorney, Agent, or Firm* — CKC & Partners Co., LLC

(57) ABSTRACT

A positioning device includes an optical sensor, an ultrasonic transceiver and a processor. The optical sensor is configured to obtain a depth image. The ultrasonic transceiver is configured to send an ultrasound and receive an ultrasound reflection. The processor is configured to target a reflective surface in the depth image, recognize a salient feature corresponding to the reflective surface in the ultrasound reflection, estimate a distance between the positioning device and reflective the surface according to a first response time of the salient feature in the ultrasound reflection.

18 Claims, 10 Drawing Sheets positioning device 100

| optical sensor 101 | processor 103 | ultrasonic sensor 102 |

(56) References Cited

FOREIGN PATENT DOCUMENTS

TW     M523862 U     6/2016
WO     2016141208 A1     9/2016

\* cited by examiner

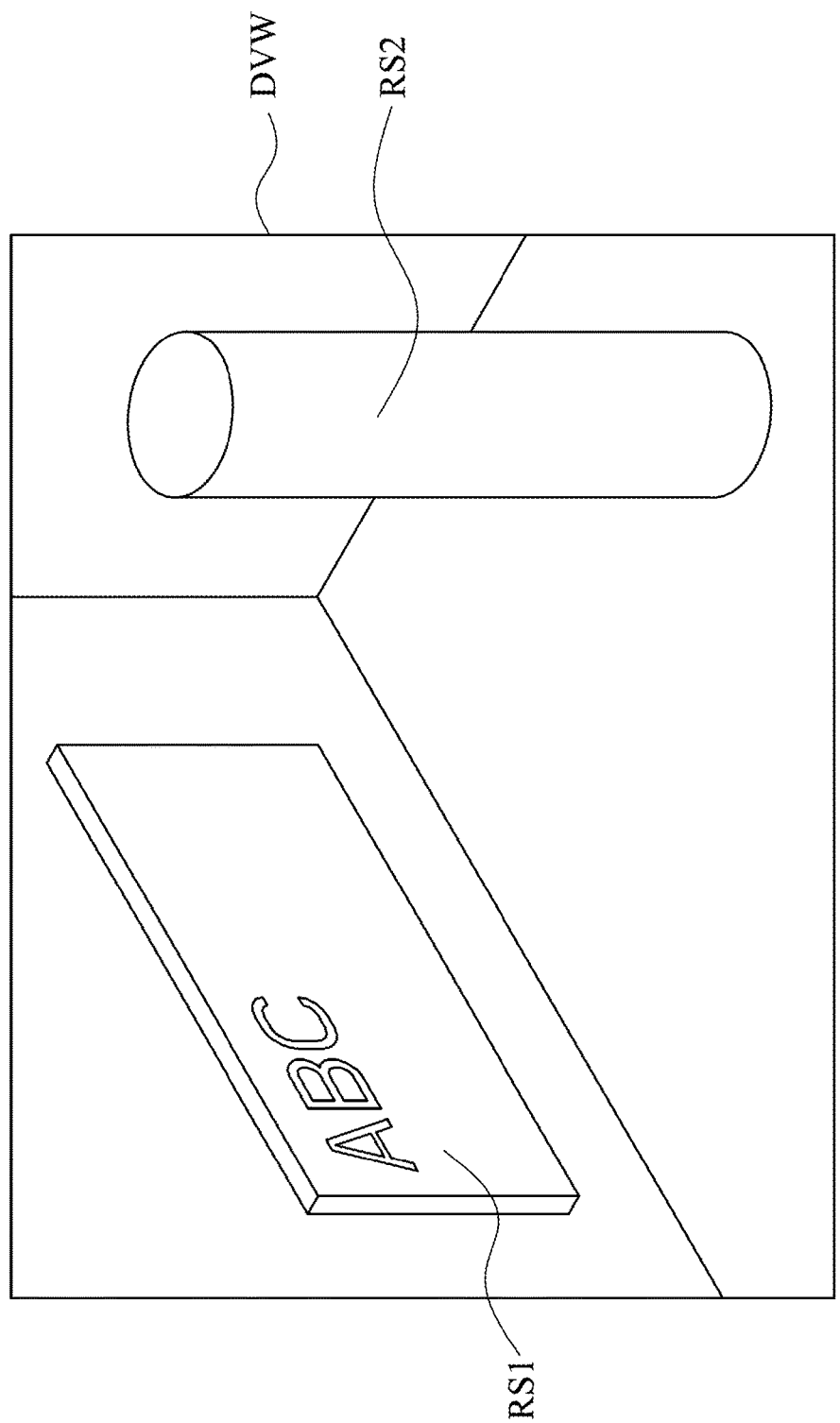

POSITIONING DEVICE AND POSITIONING METHOD

CROSS-REFERENCE TO RELATED APPLICATION

This application claims priority to U.S. Provisional Application Ser. No. 62/424,556, filed on Nov. 21, 2016, which is herein incorporated by reference.

BACKGROUND

Field of Invention

Present disclosure relates to a positioning device and a positioning method. More particularly, present disclosure relates to a positioning device and a positioning method using ultrasounds.

Description of Related Art

Nowadays, more and more electronic devices are capable of measuring relative distances by a combination of depth cameras and inertial measurement units. Using depth camera to detect distances may be effective; however, the depth camera heat and power consumption generated by the depth camera would be a huge problem during the process of measurement.

Apparently, using depth camera solely to estimate distances in a long time is not an ideal approach. Therefore, improvements are required.

SUMMARY

Aiming to solve aforementioned problems, the present disclosure provides a positioning device, a positioning device for providing a simulated environment and a positioning method.

The present disclosure provides a positioning device. The positioning device comprises an optical sensor, a first ultrasonic transceiver and a processor, wherein the processor is coupled to the optical sensor and the first ultrasonic transceiver. The optical sensor is configured to obtain a depth image. The first ultrasonic transceiver is configured to send a first ultrasound and correspondingly receive a first ultrasound reflection. The processor is configured to target a reflective surface in the depth image, wherein the processor is configured to recognize a salient feature corresponding to the reflective surface in the first ultrasound reflection, wherein the processor is configured to estimate a first distance between the positioning device and the reflective surface according to a first response time of the salient feature recognized in the first ultrasound reflection.

Another aspect of the present disclosure is to provide a positioning device for providing a simulated environment. The positioning device comprises an optical sensor, an ultrasonic transceiver, a display and a processor, wherein the processor is coupled with the optical sensor, the ultrasonic transceiver and the display. The optical sensor is configured to obtain a depth image. The ultrasonic transceiver is configured to send a first ultrasound and correspondingly receive a first ultrasound reflection. The display is configured to target reflective a surface on the depth map, wherein the processor is configured to recognize a salient feature corresponding to the reflective surface in the first ultrasound reflection, wherein the processor is configured to estimate a first distance between the positioning device and the reflective surface according to a first response time of the salient feature recognized in the first ultrasound reflection, wherein the processor is configured to update the scenario when the first distance is changing.

Another aspect of the present disclosure is to provide a positioning method. The method comprises following steps: obtaining a depth image by an optical sensor disposed on a device; sending a first ultrasound by a first ultrasonic transceiver disposed on the device; receiving a first ultrasound reflection by the first ultrasonic transceiver; targeting, by a processor coupled to the optical sensor and the first ultrasonic transceiver, a reflective surface in the depth image; recognizing, by the processor, a salient feature corresponding to the reflective surface in the first ultrasound reflection; and estimating, by the processor, a first distance between the device and the reflective surface according to a first response time of the salient feature recognized in the first ultrasound reflection.

It is to be understood that both the foregoing general description and the following detailed description are made by examples, and are intended to provide further explanation of the disclosure as claimed.

BRIEF DESCRIPTION OF THE DRAWINGS

Present disclosure can be more fully understood by reading the following detailed description of the embodiments, with reference made to the accompanying drawings as follows:

FIG. 2 is a schematic diagram of a depth view illustrated according to one embodiment of the present disclosure;

DETAILED DESCRIPTION

Figure 1:
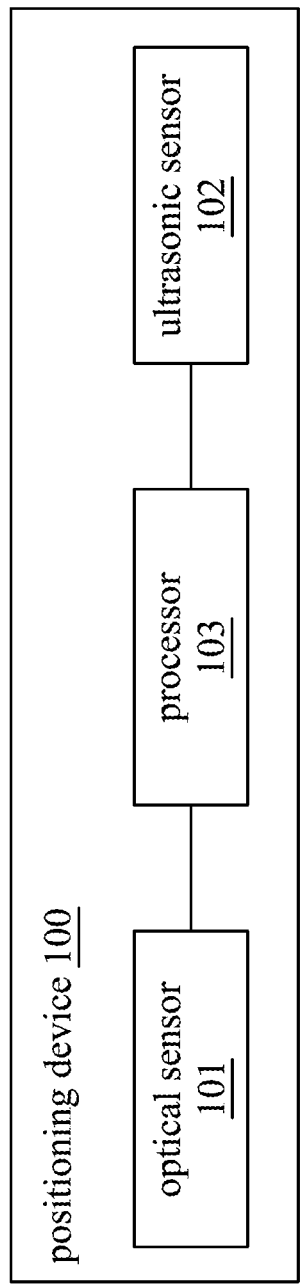
FIG. 1 is a schematic diagram of a positioning device illustrated according to one embodiment of the present disclosure.

Reference will now be made in detail to the embodiments of the present disclosure, examples of which are illustrated in the accompanying drawings. Wherever possible, the same reference numbers are used in the drawings and the description to refer to the same or like parts.

As used herein, the terms "comprising," "including," "having," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

FIG. 1 is a schematic diagram of a positioning device illustrated according to one embodiment of the present disclosure. In the embodiment, the positioning device 100 is operating in a space, e.g., a room, a chamber, a hall or a similar indoor space. The positioning device 100 includes an optical sensor 101, an ultrasonic transceiver 102 and a processor 103, wherein the optical sensor 101 and the ultrasonic transceiver 102 are electrically coupled to the processor 103. The optical sensor 101 may be a camera configured to obtain depth images from the space that the positioning device 100 is located in. The optical sensor 101 may further process the depth images then send information corresponding to the depth images to the processor 103.

In the embodiment, the ultrasonic transceiver 102 is positioned adjacent to the optical sensor 101 on the positioning device 100. The ultrasonic transceiver 102 includes an ultrasound generator and an ultrasound receiver. The ultrasonic transceiver 102 is configured to send an ultrasonic signal toward the space and to receive an ultrasound reflection corresponding to the ultrasound wave reflected from the space. When the ultrasonic transceiver 102 receives the ultrasound reflection, it can process the ultrasound reflection and send information corresponding to the ultrasound reflection to the processor 103.

In the embodiment, since the processor 103 is electrically coupled to the optical sensor 101 and the ultrasonic transceiver 102, the information collected by these sensors, such as information corresponding to the depth images or the ultrasound reflection, can be sent to the processor 103. The processor 103 can be, for instance, a CPU or a GPU configured to fetch instructions from a memory and to execute these instructions. By executing these instructions, the processor 103 can gather the depth images collected by the optical sensor 101 as a depth view of the space, wherein the depth view may substantially represent structures or furniture layouts of the space.

FIG. 2 is a schematic diagram of a depth view illustrated according to one embodiment of present disclosure. As mentioned in above embodiment, the processor 103 can generate the depth view based on the depth images collected by the optical sensor 101. As can be seen in the figure, in the embodiment, the depth view DVW represents a partial view of the mentioned space, wherein a white board RS1 and a pillar RS2 are shown in the depth view DVW. Given the depth view DVW, the processor 103 can target a reflective surface in the space in the depth view DVW. In the embodiment, the reflective surface being targeted in the depth view DVW is an artifact, especially an artifact having wide ultrasound wave reflecting areas, such as the white board RS1 and the pillar RS2. However, it is noted that the depth view DVW shown in FIG. 2 is merely an example of the depth view. The depth view does not necessitate being a visible map. People in the art may understand the depth view can refer to information generated in other form that represents depth information of the space.

It is noted, in some embodiments, the depth view DVW gathered by the processor 103 can be a partial view of a virtual map. More specifically, the optical sensor 101 can capture multiple depth images with respect to several orientations in the space with a predetermined frequency, and the depth images captured by the optical sensor 101 can be used to construct the virtual map regarding to the space. The virtual map substantially illustrates furniture and arrangements of the space that the positioning device 100 is located at. The processor 103 is further configured to turn the virtual map into a sound model, which includes information of potential sound reflection characteristics collected by the ultrasonic transceiver 102. The potential sound reflection characteristics correspond to objects found in the virtual map. For example, while the optical sensor 101 captures the multiple depth images, the ultrasonic transceiver 102 is also activated to send ultrasounds and collect ultrasound reflections. Graphic features found in the depth images can be matched to sound features from the ultrasound reflections if the graphic features and the sound features correspond to the same object in the space. Therefore, objects obtained in the virtual map by the machine vision can be utilized in sound recognitions. As such, the mentioned reflective surface being targeted in the depth view DVW can be recognized by ultrasound waves through the sound model.

As can be seen in FIG. 1, in the embodiment, by executing the instructions, the processor 103 can analyze the information corresponding to the ultrasound reflection. The processor 103 is aiming to recognize salient features from the ultrasound reflection collected by the ultrasonic transceiver 102. In the sound model, the salient features in the ultrasound reflection may correspond to the reflective surface found by the optical sensor 101. The salient features can be a waveform pattern in correspondence with a shape, a size, a reflectivity and/or a texture of the reflective surface (e.g., the white board RS1 or the pillar RS2) found in the depth view DVW captured by the optical sensor 101.

Figure 3A:
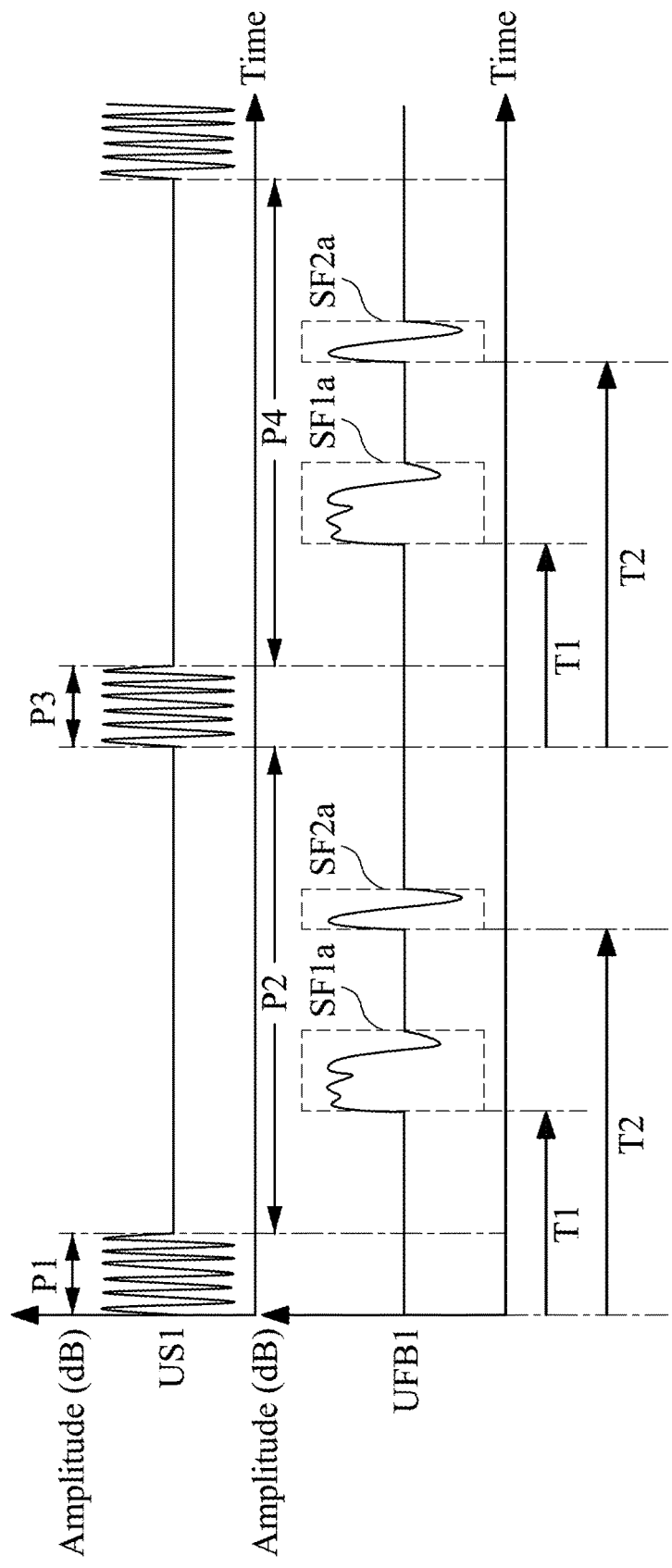
FIG. 3A is a schematic diagram illustrating waveforms of the ultrasonic signal generated by the ultrasonic transceiver and the ultrasound reflection according to an embodiment of the present disclosure.

FIG. 3A is a schematic diagram illustrating waveforms of the ultrasonic signal US1 generated by the ultrasonic transceiver 102 and the ultrasound reflection UFB1 according to an embodiment of the present disclosure. As shown in FIG. 3A, the ultrasonic signal US1 and the ultrasound reflection UFB1 are amplitude-variant waveforms over time. In the embodiment, the ultrasonic transceiver 102 sends the ultrasonic signal US1 in a predetermined format (a sine wave with a given frequency and given amplitude) in periods P1 and P3, and monitors the ultrasound reflections UFB1 in periods P2 and P4. In an embodiment, the ultrasonic transceiver 102 sends the ultrasonic signal US1 toward the white board RS1 and the pillar RS2 in FIG. 2. The ultrasonic signal US1 will be reflected by a reflective surface formed by the white board RS1 and another reflective surface formed by the pillar RS2, such that the ultrasound reflection UFB1 will be generated correspondingly and collected by the ultrasonic transceiver 102.

Since there are reflective surfaces (i.e., the white board RS1 and the pillar RS2) located in the space, the ultrasonic signal US1 will be reflected to the ultrasonic transceiver 102 by the reflective surfaces (e.g., the white board RS1 and the pillar RS2) and induce salient features SF1a and SF2a in the ultrasound reflection UFB1. The processor 103 is configured to extract the salient feature SF1a and SF2a. In this embodiment, a waveform pattern of the salient feature SF1a is recognized by the processor 103 to be corresponding to the white board RS1. A waveform pattern of the salient feature SF2a is recognized by the processor 103 to be corresponding to the pillar RS2.

The amplitude and the waveform pattern of the salient feature SF1a in the ultrasound reflection UFB1 can be varied in correspondence with a shape, a size, a reflectivity and/or a texture of the white board RS1. A response time T1 of the salient feature SF1a can be varied in correspondence with a distance between the white board RS1 and the ultrasonic transceiver 102. The amplitude and the waveform pattern of the salient feature SF2a in the ultrasound reflection UFB1 can be varied in correspondence with a shape, a size, a reflectivity and/or a texture of the pillar RS2. A response time T2 of the salient feature SF2a can be varied in correspondence with a distance between the pillar RS2 and the ultrasonic transceiver 102.

In the embodiment, the salient feature SF1a is captured in the period P2 with a response time T1 (since the ultrasound is sent at the beginning of the period P1). In an embodiment, the ultrasonic signal US1 is sent periodically by the ultrasonic transceiver 102. Therefore, the ultrasonic transceiver 102 sends the ultrasonic signal US1 in the period P3 after the period P2. Afterward, the ultrasonic transceiver 102 can collect the ultrasound reflection UFB1 again in the period P4. In practical applications, the ultrasonic transceiver 102 can send the ultrasonic signal US1 at a frequency of 10 times per second, and the ultrasonic transceiver 102 can sample the ultrasound reflection UFB1 at the same frequency of 10 times per second. If a special relationship between the ultrasonic transceiver 102 and the reflective surface remains (e.g., the positioning device remains at the same position), the same salient feature SF1a corresponding to the reflective surface (i.e., the white board RS1) will appear in the ultrasound reflection UFB1 in the period P4. As shown in FIG. 3A, the salient feature SF1a is also captured in the period P4 with the same response time T1.

It is noticed that the salient features SF1a shown in FIG. 3A are demonstrated to match the shape and the size of the white board RS1 in FIG. 2. However, when the reflective surface has a different size or a different shape, the salient feature found in the ultrasound reflection is subject to change accordingly. As shown in FIG. 3A, the ultrasound reflection UFB1 further include the salient features SF2a in the periods P2 and P4. Since there is a reflective surface (i.e., the pillar RS2) located in the space, the ultrasonic signal US1 will be reflected by the reflective surface back to the ultrasonic transceiver 102 and induce the salient feature SF2a in the ultrasound reflection UFB1. The processor 103 is configured to extract the salient feature SF2a, and a waveform pattern of the salient feature SF2a is recognized by the processor 103 to be corresponding to the pillar RS2. A waveform pattern of the salient feature SF2a is varied in correspondence with a shape, a size, a reflectivity and/or a texture of the pillar RS2. Because the pillar RS2 has a shape and a size different from the white board RS1, the salient feature SF2a induced by the pillar RS2 is different from the salient feature SF1a in FIG. 3A. An occurring time of the salient feature SF2a in the ultrasound reflection UFB1 will be varied in correspondence with a distance between the pillar RS2 and the ultrasonic transceiver 102. In the embodiment, the salient feature SF2a is captured in the period P2 with another response time T2 (since the ultrasound is sent at the beginning of the period P1).

According to the ultrasound reflection UFB1, the processor 103 can examine the distance between the white board RS1 and the ultrasonic transceiver 102 by the response time T1, and also examine the distance between the pillar RS2 and the ultrasonic transceiver 102 by the response time T2. In this case, the response time T2 is longer than the response time T1, and the processor 103 will acknowledge that the positioning device 100 is currently located closer to the white board RS1 and away from the pillar RS2.

Figure 3B:
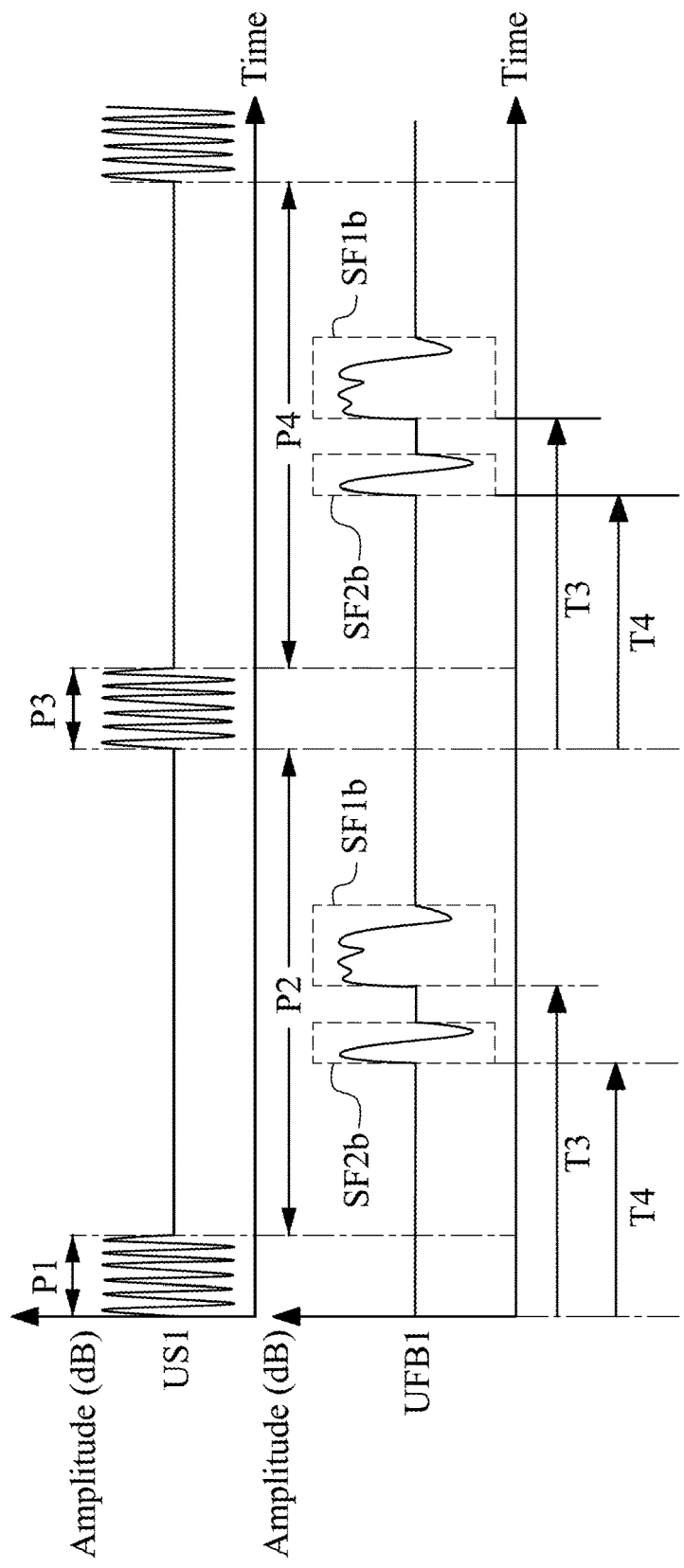
FIG. 3B is a schematic diagram illustrating waveforms of the ultrasonic signal generated by the ultrasonic transceiver and the ultrasound reflection when the positioning device has moved to another position in an embodiment.

When the positioning device 100 moves to another position (e.g., the positioning device 100 moves away from the white board RS1) in the space, a similar salient feature (corresponding to the white board RS1) will still be detected in another ultrasound reflection collected by the ultrasonic transceiver 102, but the response time of the salient feature will be variant in this case. Reference is made to FIG. 3B, which is a schematic diagram illustrating waveforms of the ultrasonic signal US1 generated by the ultrasonic transceiver 102 and the ultrasound reflection UFB2 when the positioning device 100 has moved to another position in the embodiment. As shown in FIG. 3B, the ultrasonic transceiver 102 sends the ultrasonic signal US1 in a predetermined format (a sine wave with a given frequency and given amplitude) in periods P1 and P3, and monitors the ultrasound reflections UFB2 in periods P2 and P4. In FIG. 3B, the ultrasound reflections UFB2 has salient feature SF1b in the periods P2 and P4. Because the salient features SF1a and SF1b are induced by the same reflective surface (white board RS1), waveform patterns of the salient feature SF1b in FIG. 3B are similar (or identical) to the salient feature SF1a in FIG. 3A. A difference between the ultrasound reflections UFB1 and the ultrasound reflections UFB2 is that the salient feature SF1b captured in the period P2 (or the period P4) is detected at a response time T3 since the beginning of the period P1 (or the period P3). The response time T3 shown in FIG. 3B is longer than the response time T1 shown in FIG. 3A. The response time T3 in the embodiment shown in FIG. 3B indicates a longer distance existed between the ultrasonic transceiver 102 and the white board RS1 (relative to the embodiment shown in FIG. 3A).

In an embodiment, a time difference between the response time T1 and the response time T3 indicates a relative movement of the positioning device 100. Since the response time T3 is longer than the response time T1, the processor 103 can detect that the positioning device 100 has moved away from the white board RS1 according to a difference between the ultrasound reflection UFB2 in FIG. 3B and the ultrasound reflection UFB1 in FIG. 3A.

In addition, the ultrasound reflections UFB2 in FIG. 3B have salient feature SF2b in the periods P2 and P4. Because the salient features SF2a and SF2b are induced by the same reflective surface (i.e., the pillar RS2), waveform patterns of the salient feature SF2b in FIG. 3B are similar (or identical) to the salient feature SF2a in FIG. 3A. A difference about the salient feature SF2b between the ultrasound reflections UFB1 and the ultrasound reflections UFB2 is that the salient feature SF2b captured in the period P2 (or the period P4) is detected at a response time T4 since the beginning of the period P1 (or the period P3). The response time T4 shown in FIG. 3B is shorter than the response time T2 shown in FIG. 3A. The response time T4 in the embodiment shown in FIG. 3B indicates a shorter distance existed between the ultrasonic transceiver 102 and the pillar RS2 (relative to the embodiment shown in FIG. 3A).

In an embodiment, a time difference between the response time T2 and the response time T4 indicates a relative movement of the positioning device 100. Since the response time T4 is shorter than the response time T2. The processor 103 can detect that the positioning device 100 has moved closer to the pillar RS2 according to a difference between the ultrasound reflection UFB2 in FIG. 3B and the ultrasound reflection UFB1 in FIG. 3A.

Furthermore, according to the ultrasound reflection UFB2 in FIG. 3B, the processor 103 can examine the distance between the white board RS1 and the ultrasonic transceiver 102 by the response time T3, and also examine the distance between the pillar RS4 and the ultrasonic transceiver 102 by the response time T4. In this case, the response time T4 is shorter than the response time T3, and the processor 103 will acknowledge that the positioning device 100 is currently located closer to the pillar RS2 and away from the white board RS1.

It is noticed that the salient feature SF1a and the salient feature SF1b shown in FIG. 3A and FIG. 3B are demonstrated to match the shape, size, reflectivity and/or texture of the white board RS1 in FIG. 2, and the salient feature SF2a and the salient feature SF2b shown in FIG. 3A and FIG. 3B are demonstrated to match the shape and the size of the pillar RS2 in FIG. 2. However, when the reflective surface has a different size or a different shape, the salient feature found in the ultrasound reflection is subject to change accordingly.

The reference is made to FIG. 1. In the embodiment, by executing the instructions, the processor 103 may estimate a distance between the positioning device 100 and the reflective surface according to the response time of the salient feature in the ultrasound reflection. It has been noted that the response time of the salient feature mentioned in the embodiment are occurring times of the salient feature being detected in the ultrasound reflection. When the processor 103 recognizes the salient feature corresponding to the reflective surface in the ultrasound reflection, the processor 103 may detect where the salient feature is on the timeline graph of the ultrasound reflection. Based on the time difference of the salient feature is observed on the waveforms of the ultrasound reflection, the processor 103 may estimate the relative movement between the positioning device 100 and the reflective surface in the space. For example, as shown in the FIG. 3A and FIG. 3B, on the timeline graphs of the ultrasound reflections, since the salient features SF1a and SF1b corresponding to the reflective surface is captured with different response times, the processor 103 can detect that the positioning device 100 is moving away from the white board RS1. Similarly, the salient features SF2a and SF2b shown in the FIG. 3A and FIG. 3B is captured with different response times, it indicates that positioning device 100 is moving closer to the pillar RS2.

Figure 4:
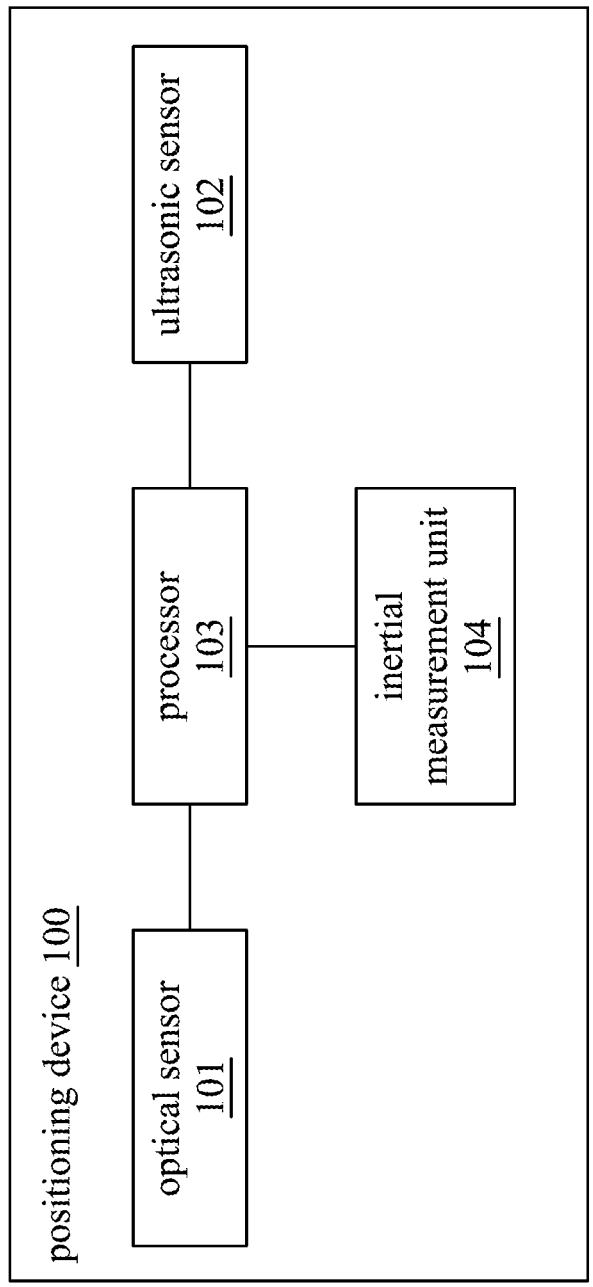
FIG. 4 is a schematic diagram of a positioning device illustrated according to one embodiment of the present disclosure.

FIG. 4 is a schematic diagram of a positioning device illustrated according to one embodiment of the present disclosure. Similar to the embodiment of FIG. 1, in the embodiment, the positioning device 100 includes the optical sensor 101, the ultrasonic transceiver 102 and the processor 103, wherein the optical sensor 101 and the ultrasonic transceiver 102 are electrically coupled to the processor 103. However, in the embodiment, the positioning device 100 further comprises an inertial measurement unit 104, wherein the inertial measurement unit 104 is electrically coupled to the processor 104 and is configured to track a spatial vector of the positioning device 100 with respect to the space. When the positioning device 100 is moving in the space, the inertial measurement unit 104 may detect the movement of the positioning device 100 and generate the spatial vector. According to the spatial vector, the processor 103 may obtain an angle between a first axis extended from the positioning device 100 and a second axis extended from the reflective surface. For example, if the first axis is an axis indicates a direction that the ultrasonic transceiver 102 is pointing to, and the second axis is the geometric normal of the white board RS1, when the angle between the pointing direction of the ultrasonic transceiver 102 and the geometric normal of the white board RS1 is acquired, the positioning device 100 can adjust the previously mentioned estimated distance according to the angle.

Figure 5:
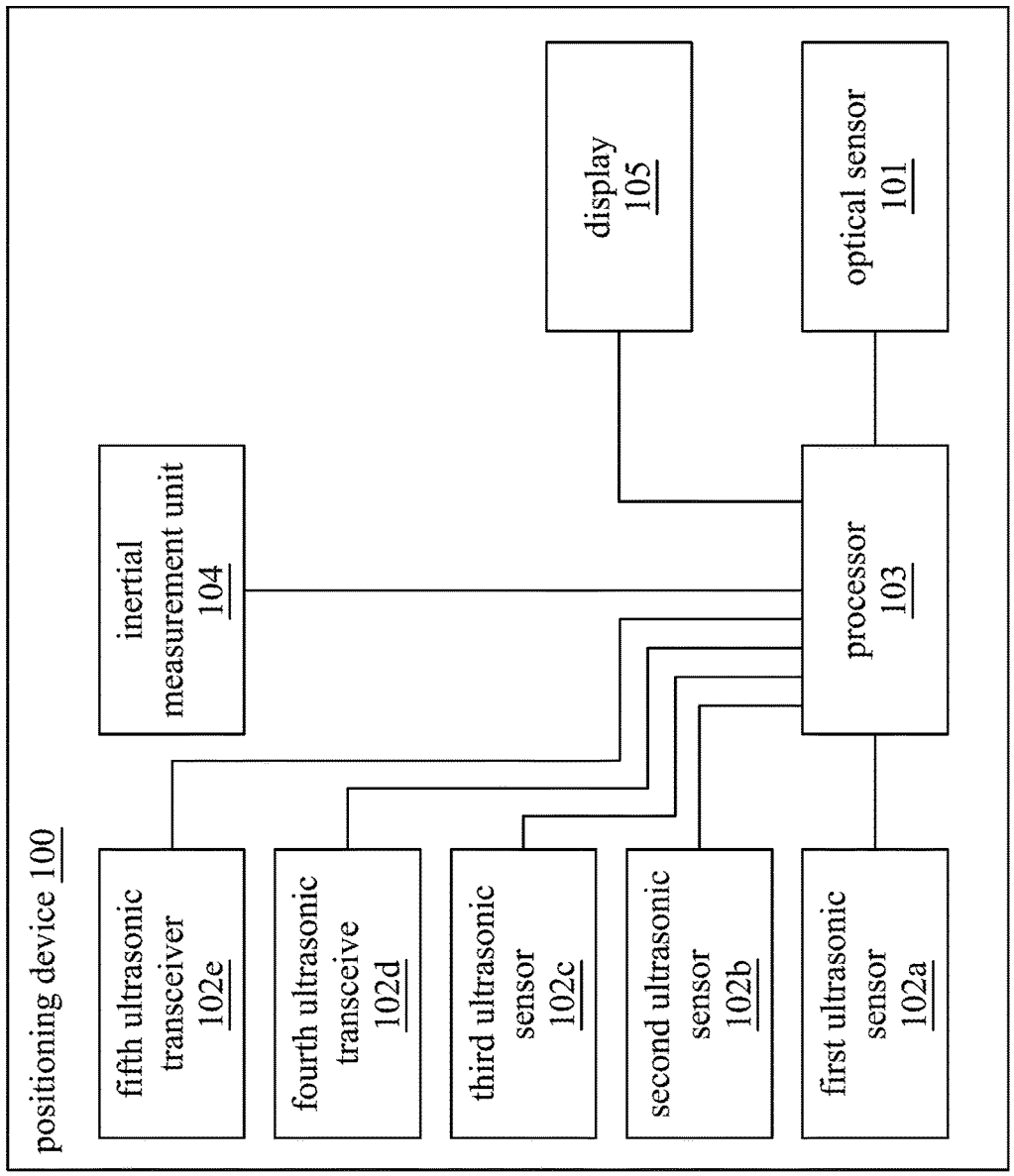
FIG. 5 is a schematic diagram of a positioning device illustrated according to one embodiment of the present disclosure.

FIG. 5 is a schematic diagram of a positioning device illustrated according to one embodiment of the present disclosure. In the embodiment, the positioning device 100 includes an optical sensor 101, a first ultrasonic transceiver 102a, a second ultrasonic transceiver 102b, a third ultrasonic transceiver 102c, a fourth ultrasonic transceiver 102d, a fifth ultrasonic transceiver 102e, a processor 103, an inertial measurement unit 104 and a display 105. It should be noted, the positioning device 100 in the embodiment is in particular a device configured to provide a simulated environment to a user. The optical sensor 101, the ultrasonic transceivers 102a-102e, the inertial measurement unit 104 and the display 105 are all electrically coupled to the processor 103. Similar to the embodiment shown in FIG. 1, the optical sensor 101 can be a camera configured to obtain depth images from the space, wherein the optical sensor 101 can process the depth images then send information corresponding to the depth images to the processor 103. However, in the embodiment, the positioning device 100 has five ultrasonic transceivers 102a-102e, and these ultrasonic transceivers 102a-102e are disposed to send ultrasonic signals toward the space and to receive ultrasound reflections from the space respectively. When these ultrasonic transceivers receive the ultrasound reflections, respectively, they can process the ultrasound reflections and send information corresponding to the ultrasound reflections to the processor 103. It is noted, the ultrasonic signals sent by each ultrasonic transceiver can be ultrasonic waves generated with unique amplitudes and frequencies so that each ultrasonic transceiver can recognize the ultrasound reflection corresponding to the signal it sent correctly. Or each ultrasonic transceiver can send/receive the ultrasonic signals in a time-division manner so as to avoid the interference among the ultrasonic signals sent from different ultrasonic transceivers.

For example, in the embodiment of FIG. 2, as shown in the depth view DVW, when the positioning device 100 has recorded the depth view DVW and generate the sound model correspondingly. The processor 103 can target possible reflective surfaces in the sound model, and each of the ultrasonic transceivers 102a-102e can be disposed toward different directions to cover different areas in the space. For instance, when the first ultrasonic transceiver 102a is disposed in one direction toward the white board RS1 in the space, the ultrasound reflection received by the first ultrasonic transceiver 102a can be used to track the white board RS1 in the depth view DVW. Meanwhile the second ultrasonic transceiver 102b is disposed in another direction toward the pillar RS2 and the ultrasound reflection it receives can be used to track the pillar RS2 in the depth view DVW. It is to say, based on the directions that each ultrasonic transceiver is directed to, the processor 103 can estimate distances between the positioning device 100 and multiple reflective surfaces simultaneously. In the embodiment, the processor 103 can generate a depth view based on the depth images and then target a reflective surface in the space in the depth view. In the embodiment, the surface targeted in the depth view is an artifact, especially an artifact having wide ultrasound wave reflecting areas, such as a desk, a table, a ceiling, a board, a window, a wall or a pillar. After targeting the reflective surface in the depth view, the processor 103 starts to analyze the information corresponding to the ultrasound reflections and recognize salient features corresponding to the reflective surface being targeted in the ultrasound reflections. Since these ultrasonic transceivers can receive reflections reflected from different parts of the reflective surface, the processor 103 may estimate a distance between the positioning device 100 and the reflective surface by considering the response times of the salient features shown in the ultrasound reflections. Apparently, with two more ultrasonic transceivers, the positioning device 100 may estimate the distance with higher accuracy.

In the embodiment, the display 105 of the positioning device 100 is configured to output a scenario of the simulated environment to the user, wherein the simulated environment mentioned here is constructed by one or several computing devices to generate realistic images, sounds and other sensations that simulate the user's physical presence in the simulated environment. For example, the simulated environment can be a virtual reality (VR) space, augmented reality (AR) space or mixed reality (MR) space. In one case, the processor 103 is in communication with some simulated environment servers in order to transmit information for representing the scenario of the simulated environment to the user via the display 105. As mentioned, based on the spatial vector and the salient features recognized in the ultrasound reflection waves, the processor 103 may estimate the relative distance between the positioning device 100 and at least one solid obstacle in the space. By wearing the positioning device 100, the processor 103 may response to the simulated environment servers with accurate positions of the positioning device 100 in the space. As such, when the user is immersed in the simulated environment, unnecessary bumping accidents can be avoided.

Figure 6A:
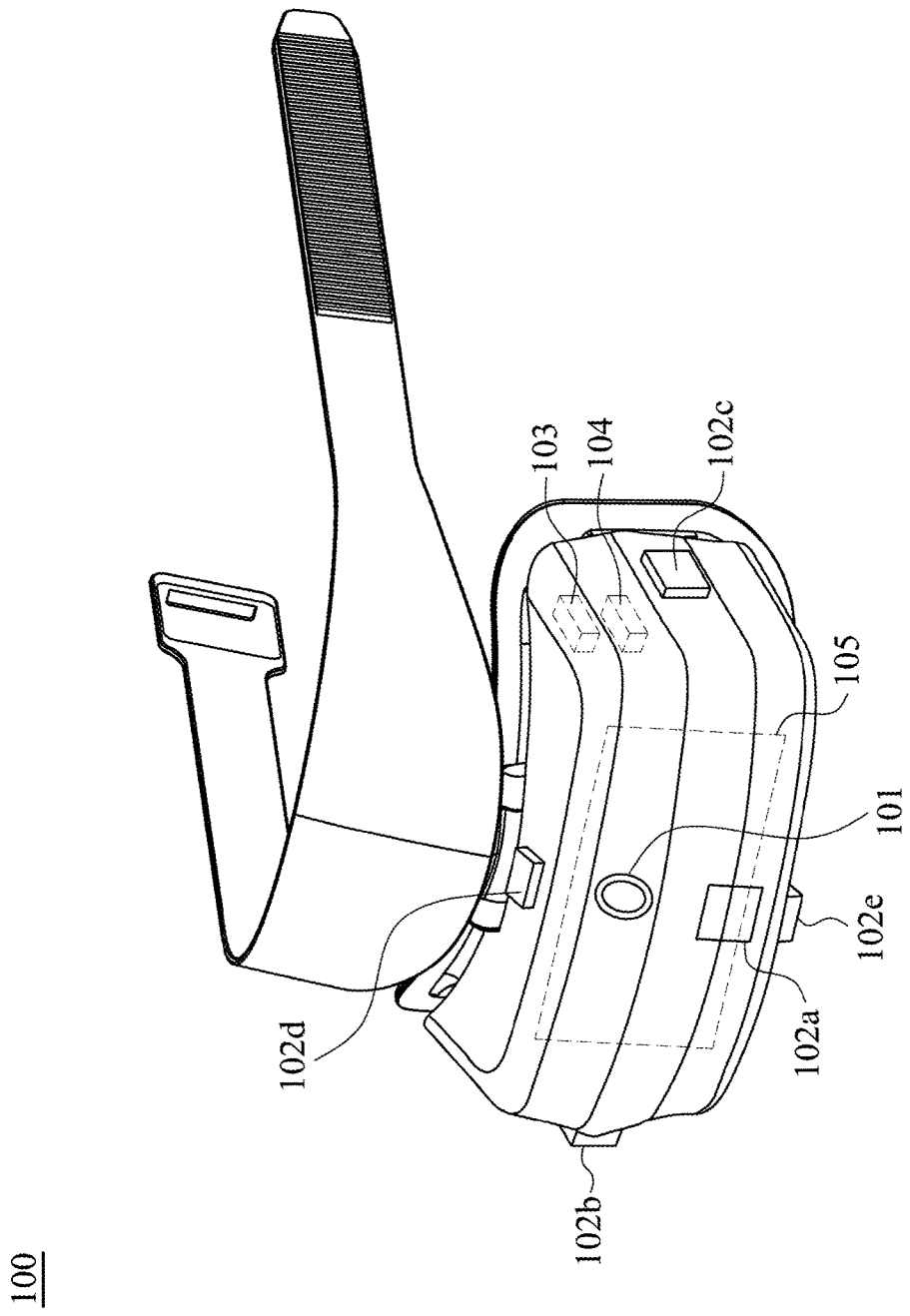
FIG. 6A is a schematic diagram of a positioning device illustrated according to one embodiment of the present disclosure.

FIG. 6A is a schematic diagram of a positioning device illustrated according to one embodiment of the present disclosure. FIG. 6A shows the appearance of the positioning device 100. As shown in the figure, the optical sensor 101, the ultrasonic transceivers 102a-102e can be observed on the exterior of the positioning device 100. The processor 103, the inertial measurement unit 104 and the display 105 mentioned in FIG. 5 are inner parts of the positioning device 100 which cannot be seen from the exterior. As shown in the figure, the first ultrasonic transceiver 102a is configured at the front of the positioning device 100, and the ultrasonic transceivers 102b-102e, are configured at the right side, left side, upside and downside of the positioning device 100, respectively. As mentioned, the configuration in the embodiment is more effective than the configuration with a single ultrasonic transceiver only. Regarding the functions of the components mentioned in the embodiment, since they have been described in aforementioned embodiments, especially the embodiment of FIG. 5, the explanations will not be repeated here again. However, it should be understood, the configuration of the positioning device 100 shown in the figure is a demonstrational example, and people in the art may rearrange or add ultrasonic transceivers to enlarge the listening range of the positioning device 100.

Figure 6B:
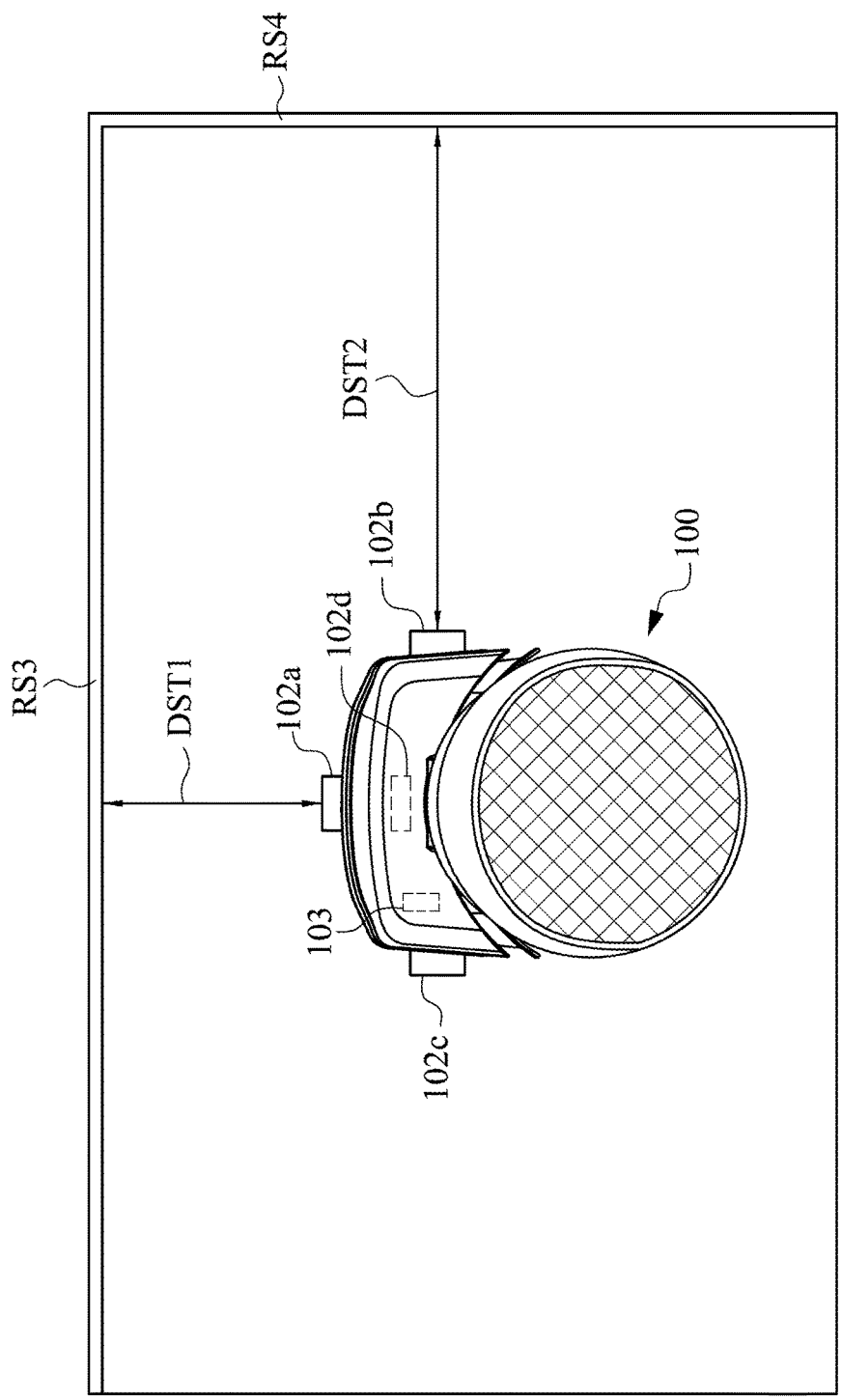
FIG. 6B is a schematic diagram of a positioning device illustrated according to one embodiment of the present disclosure.

FIG. 6B is a schematic diagram of a positioning device illustrated according to one embodiment of the present disclosure. The structure of the positioning device 100 shown in the figure can be referenced to the embodiment of FIG. 6A. The figure is a schematic diagram shows the positioning device 100 viewed from above. The positioning device 100 is carried by a user in a space. As can be seen, the first ultrasonic transceiver 102a can send a first ultrasonic signal toward a first direction and receive a first ultrasound reflection reflected by a third reflective surface RS3 (e.g. front wall). As such, by detecting a response time of a salient feature corresponding to the third reflective surface RS3 in the first ultrasound reflection, the processor 103 can estimate a first distance DST1 between the third reflective surface RS3 and the first ultrasonic transceiver 102a. Since the second ultrasonic transceiver 102b can send a second ultrasonic signal toward a second direction and receive a second ultrasound reflection reflected by a fourth reflective surface RS4 (e.g. lateral wall), the processor 103 can estimate a second distance DST2 between the fourth reflective surface RS4 and the second ultrasonic transceiver 102b according to a response time of a salient feature corresponding to the fourth reflective surface RS4 in the second ultrasound reflection. When the processor 103 acquires the first distance DST1 and the second distance DST2, the processor 103 can estimate a horizontal position of the positioning device 100 with respect to the space. Moreover, by keeping monitoring the first distance DST1 and the second distance DST2, the processor 103 can further determine a horizontal displacement of the positioning device 100 in the space based on the first distance DST1 and the second distance DST2 and/or variations of the first distance DST1 and the second distance DST2 over time.

Figure 6C:
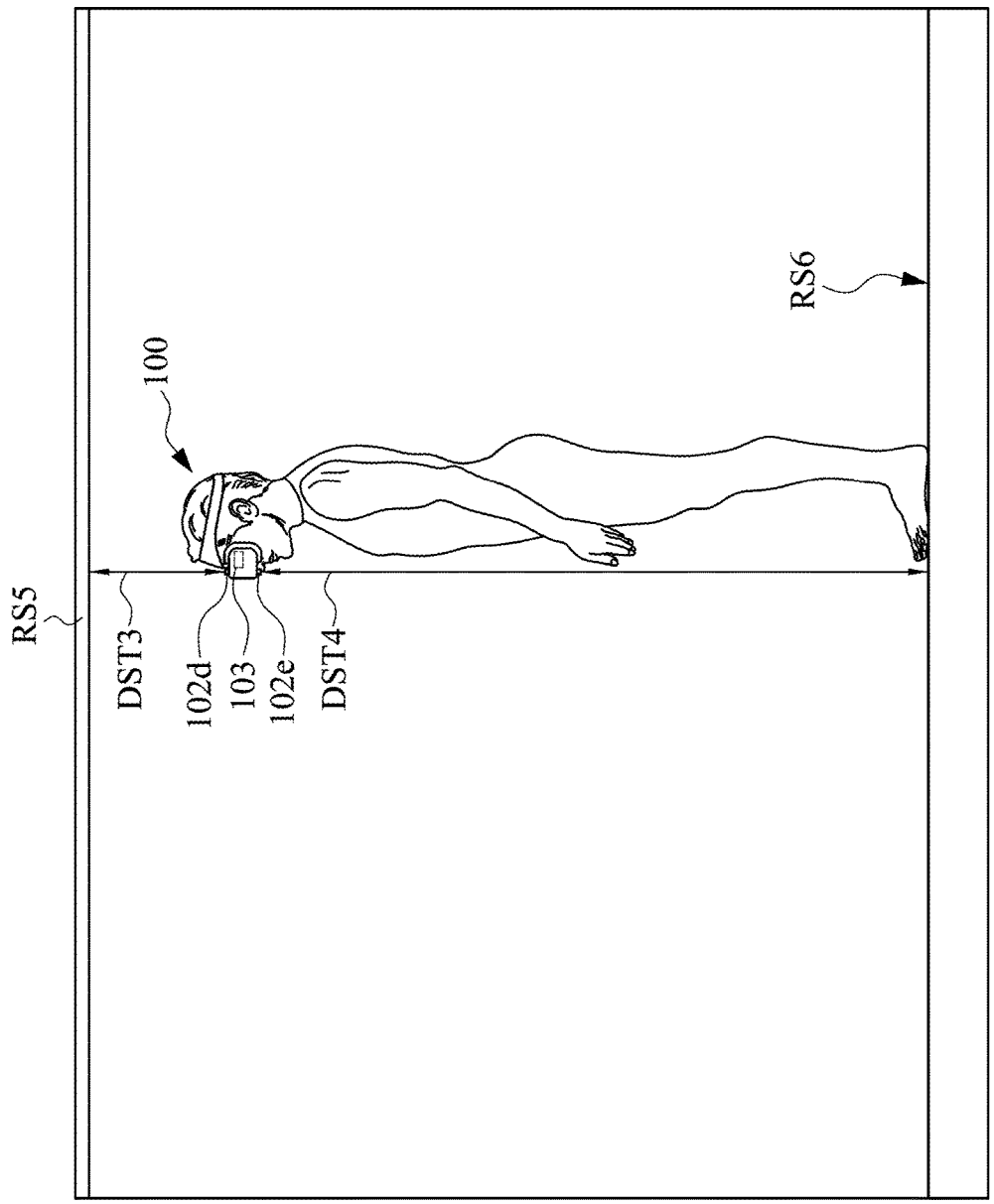
FIG. 6C is a schematic diagram of a positioning device illustrated according to one embodiment of the present disclosure.

FIG. 6C is a schematic diagram of a positioning device illustrated according to one embodiment of the present disclosure. The structure of the positioning device 100 shown in the figure can be referenced to the embodiment of FIG. 6A as well. The figure is a schematic diagram shows the positioning device 100 viewed from lateral. The positioning device 100 is carried by the user in the space as shown in FIG. 6B. As can be seen, in the same manner as shown in FIG. 6B, the fourth ultrasonic transceiver 102d can be used to estimate a third distance DST3 between the positioning device 100 and a fifth reflective surface RS5 (e.g. a ceiling), and the fifth ultrasonic transceiver 102e can be used to measure a fourth distance DST4 between the positioning device 100 and a sixth reflective surface RS6 (e.g. floor). As such, when the processor 103 acquires the third distance DST3 and the fourth distance DST4, the processor 103 can estimate a vertical position of the positioning device 100 with respect to the space. Moreover, by keeping monitoring the third distance DST3 and the fourth distance DST4, the processor 103 can further determine a vertical displacement of the positioning device 100 in the space based on the third distance DST3 and the fourth distance DST4 and/or variations of the third distance DST3 and the fourth distance DST4 over time.

Figure 7:
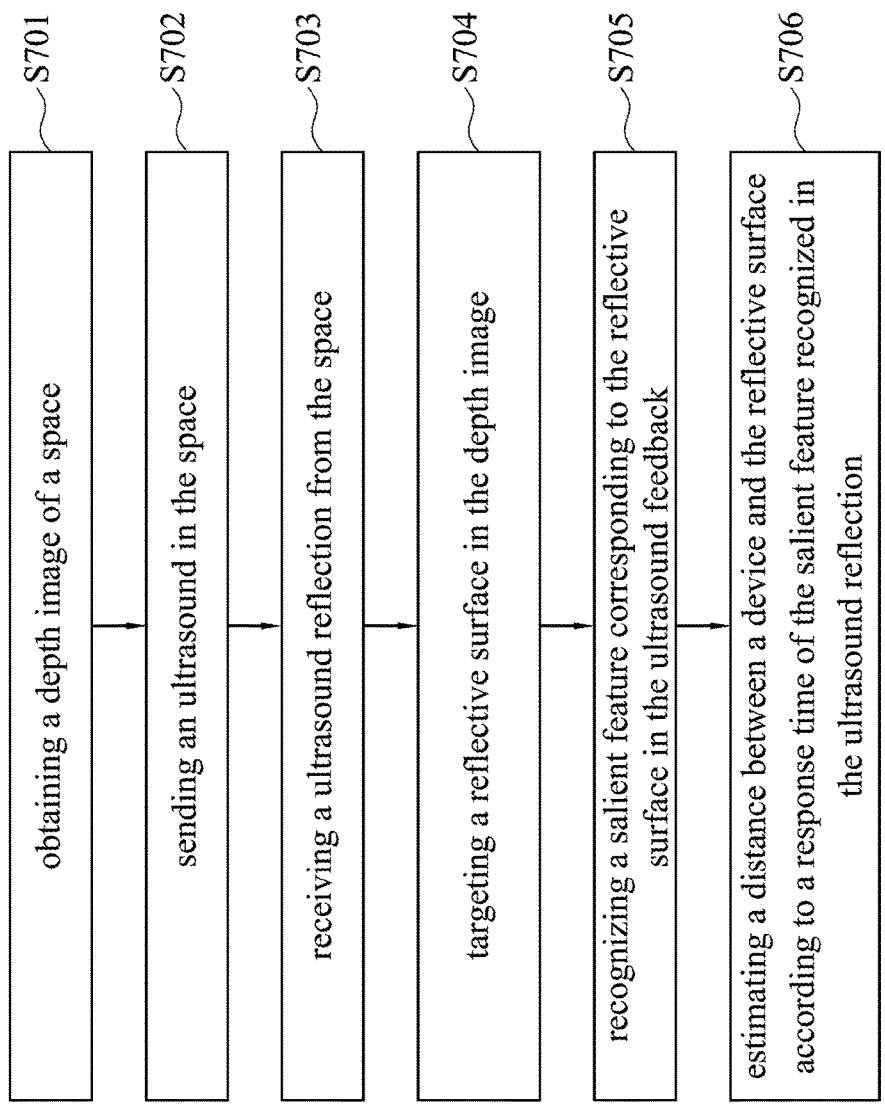
FIG. 7 is a flow chart of a positioning method illustrated according to some embodiments of the present disclosure.

FIG. 7 is a flow chart of a positioning method illustrated according to some embodiments of the present disclosure. In the embodiment, the positioning method 700 is executed by the positioning device 100 mentioned in foregoing embodiments, the references to the embodiments are herein incorporated. In the embodiment, the steps of the positioning method 700 will be listed and explained in detail in the following paragraphs.

Step S701: obtaining a depth image of a space. As described in the embodiment of FIG. 1, the optical sensor 101 of the positioning device 100 is electrically coupled to the processor 103, wherein the optical sensor 101 can obtain depth images from the space that the positioning device 100 is located in. When the optical sensor 101 obtain depth images from the space, it may further process these depth images then send information corresponding to these depth images to the processor 103. As described in the embodiment of FIG. 5, the optical sensor 101 of the positioning device 100 is also configured to obtain depth images from the space and send information corresponding to these depth images to the processor 103.

Step S702: sending an ultrasound toward a first direction in the space. As described in the embodiment of FIG. 1, the ultrasonic transceiver 102 of the positioning device 100 is electrically coupled to the processor 103, wherein the ultrasonic transceiver 102 is configured to send the ultrasound wave toward the specific direction. As described in the embodiment of FIG. 5, five ultrasonic transceivers, which are the first ultrasonic transceiver 102a, the second ultrasonic transceiver 102b, the third ultrasonic transceiver 102c, the fourth ultrasonic transceiver 102d and fifth ultrasonic transceiver 102e, are configured to send ultrasonic signals toward five different directions, respectively.

Step S703: receiving an ultrasound reflection reflected from the direction. As described in the embodiment of FIG. 1, after the ultrasonic signal is sent, the ultrasonic transceiver 102 can receive the ultrasound reflection reflected from the specific direction after a while. When the ultrasonic transceiver 102 receives the ultrasound reflection, the ultrasonic transceiver 102 can send the information corresponding to the ultrasound reflection to the processor 103. As described in the embodiment of FIG. 5, the first ultrasonic transceiver 102a, the second ultrasonic transceiver 102b, the third ultrasonic transceiver 102c , the fourth ultrasonic transceiver 102d and fifth ultrasonic transceiver 102e are configured to receive ultrasound reflections corresponding to the ultrasound waves respectively, and to send information corresponding to these ultrasound reflections to the processor 103.

Step S704: targeting a reflective surface in the depth image. As described in the embodiment of FIG. 1, when the information corresponding to the depth image is sent to the processor 103, the processor 103 may target the reflective surface in the depth image. For instance, in the embodiment of FIG. 2, the processor 103 can target the white board RS1 or the pillar RS2 as the reflective surface in the depth view DVW. In the same manner, the processor 103 described in the embodiment of FIG. 5 is also configured to target a reflective surface in the space in the depth image. Moreover, as mentioned, the targeted surface in an embodiment is a part of an artifact. The targeted surface may have a wide ultrasound wave reflecting area, such that it will be effective to recognize the salient feature recognition result corresponding to the targeted surface.

Step S705: recognizing a salient feature corresponding to the reflective surface in the ultrasound reflection. As described in the embodiment of FIG. 1, the processor 103 can analyze the ultrasound reflection wave to recognize salient features corresponding to the reflective surface being target in the ultrasound reflection wave. It should be understood, depends on what kind of surface is targeted, the salient features shown on the timeline graph of the ultrasound reflection wave can be different. Examples of the timeline graph of the ultrasound reflection wave can be seen in FIG. 3A-3B.

Step S706: estimating a distance between a device and the reflective surface according to a response time of the salient feature recognized in the ultrasound reflection. As described in the embodiment of FIG. 1, the processor 103 can estimate the distance between the positioning device 100 and the surface according to the response time of the salient feature in the ultrasound reflection wave. As described in the embodiments of FIG. 3A-3B, when the processor 103 detects the salient feature SF1 occur with short response time, it may estimate the distance between the positioning device 100 and the reflective surface according to the response times.

As described above, the positioning device can be used to estimate distance between the positioning device and some exist obstacles according to ultrasound and depth information. Combination of ultrasound and depth information provides a power-saving approach to position the device in the space with higher accurately. Also, with the aid of the virtual map constructed by depth images, the efficiency of the salient feature recognition can be significantly improved. Moreover, the positioning device of present disclosure can be further established on simulated environment systems to provide better game experiences.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A positioning device, comprising:
an optical sensor, configured to obtain a depth image;
a first ultrasonic transceiver, configured to send a first ultrasound and correspondingly receive a first ultrasound reflection; and
a processor, coupled with the optical sensor and the first ultrasonic transceiver, wherein the processor is configured to target a reflective surface in the depth image, recognize a salient feature corresponding to the reflective surface in the first ultrasound reflection, estimate a first distance between the positioning device and the reflective surface according to a first response time of the salient feature recognized in the first ultrasound reflection.

2. The positioning device of claim 1, further comprising:
an inertial measurement unit, coupled with the processor, configured to track a spatial vector of the positioning device, wherein the processor is configured to adjust the first distance according to the spatial vector.

3. The positioning device of claim 2, wherein the processor is configured to obtain an angle between a first axis of the positioning device and a second axis of the surface according to the spatial vector, and wherein the processor is configured to adjust the first distance according to the angle.

4. The positioning device of claim 1, wherein the reflective surface is a part of an artifact.

5. The positioning device of claim 1, wherein the salient feature comprises a waveform pattern in correspondence with the reflective surface targeted in the depth image.

6. The positioning device of claim 1, further comprising:
a second ultrasonic transceiver, configured to send a second ultrasound and correspondingly receive a second ultrasound reflection, the second ultrasonic transceiver being disposed toward a direction different from the first ultrasonic transceiver;
wherein the processor is further configured to recognize the salient feature corresponding to the reflective surface in the second ultrasound reflection, wherein the processor is configured to estimate a second distance between the device and the reflective surface according to a second response time of the salient feature in the second ultrasound reflection.

7. The positioning device of claim 6, wherein processor is further configured to determine a displacement of the positioning device according to the first distance and the second distance.

8. A positioning device for providing a simulated environment, comprising:
   an optical sensor, configured to obtain a depth image;
   a first ultrasonic transceiver, configured to send a first ultrasound and correspondingly receive a first ultrasound reflection;
   a display, configured to output a scenario of the simulated environment; and
   a processor, coupled with the optical sensor, the ultrasonic transceiver, and the display, wherein the processor is configured to target a reflective surface in the depth image, recognize a salient feature corresponding to the reflective surface in the first ultrasound reflection, estimate a first distance between the positioning device and the reflective surface according to a first response time of the salient feature recognized in the first ultrasound reflection, wherein the processor is configured to update the scenario when the first distance is changing.

9. The positioning device of claim 8, further comprising:
   an inertial measurement unit, coupled with the processor, configured to track a spatial vector of the positioning device, wherein the processor is configured to adjust the first distance according to the spatial vector.

10. The positioning device of claim 8, further comprising:
    a second ultrasonic transceiver, configured to send a second ultrasound and correspondingly receive a second ultrasound reflection, the second ultrasonic transceiver being disposed toward a direction different from the first ultrasonic transceiver;
    wherein the processor is further configured to recognize the salient feature corresponding to the reflective surface in the second ultrasound reflection, wherein the processor is configured to estimate a second distance between the device and the reflective surface according to a second response time of the salient feature in the second ultrasound reflection.

11. The positioning device of claim 10, wherein processor is further configured to determine a displacement of the positioning device according to the first distance and the second distance.

12. A positioning method, comprising:
    obtaining a depth image by an optical sensor disposed on a device;
    sending, by a first ultrasonic transceiver disposed on the device, a first ultrasound;
    receiving, by the first ultrasonic transceiver, a first ultrasound reflection;
    targeting, by a processor coupled to the optical sensor and the first ultrasonic transceiver, a reflective surface in the depth image;
    recognizing, by the processor, a salient feature corresponding to the reflective surface in the first ultrasound reflection; and
    estimating, by the processor, a first distance between the device and the reflective surface according to a first response time of the salient feature recognized in the first ultrasound reflection.

13. The positioning method of claim 12, further comprising:
    tracking, by an inertial measurement unit disposed on the device, a spatial vector of the device; and
    adjusting, by the processor, the first distance according to the spatial vector.

14. The positioning method of claim 13, further comprising:
    obtaining, by the processor, an angle between a first axis of the positioning device and a second axis of the surface according to the spatial vector; and
    adjusting, by the processor, the first distance according to the angle.

15. The positioning method of claim 12, wherein the reflective surface is a part of an artifact.

16. The positioning method of claim 12, wherein the salient feature comprises a waveform pattern in correspondence with the reflective surface targeted in the depth image.

17. The positioning method of claim 12, further comprising:
    sending a second ultrasound by a second ultrasonic transceiver disposed toward a direction different from the first ultrasonic transceiver on the device;
    receiving a second ultrasound reflection by the second ultrasonic transceiver;
    recognizing, by the processor, the salient feature corresponding to the reflective surface in the second ultrasound reflection; and
    estimating, by the processor, a second distance between the device and the reflective surface according to a second response time of the salient feature in the second ultrasound reflection.

18. The positioning method of claim 17, further comprising:
    determining, by the processor, a displacement of the positioning device according to the first distance and the second distance.

* * * * *